(12) United States Patent
Romig

(10) Patent No.: US 6,305,131 B1
(45) Date of Patent: Oct. 23, 2001

(54) HAZARDOUS MATERIAL STORAGE FACILITY WITH SLOPED FLOORS AND METHOD OF CONSTRUCTION

(76) Inventor: Frederick W. Romig, 2734 Meadowcrest Ct., Wexford, PA (US) 15090

(*) Notice: Subject to any disclaimer, the term of this patent is extended or adjusted under 35 U.S.C. 154(b) by 0 days.

(21) Appl. No.: 09/411,486

(22) Filed: Oct. 1, 1999

(51) Int. Cl.[7] ........................................... E04H 1/00
(52) U.S. Cl. ........................ 52/79.1; 405/128; 588/259
(58) Field of Search ................... 52/79.1, 192; 405/128; 588/259; 210/163, 164

(56) References Cited

U.S. PATENT DOCUMENTS

| | | | |
|---|---|---|---|
| 4,973,195 | * 11/1990 | Sweeney | 405/128 |
| 5,030,033 | * 7/1991 | Heintzelman | 405/128 |
| 5,213,438 | * 5/1993 | Barenwald | 405/2 |
| 5,248,220 | * 9/1993 | Rohringer | 405/53 |
| 5,254,798 | * 10/1993 | Zoback | 588/259 |
| 5,285,617 | * 2/1994 | Romig | 52/745.01 |
| 5,511,908 | * 4/1996 | Van Valkenburgh | 405/128 |
| 5,562,047 | * 10/1996 | Forney | 108/51.1 |
| 5,735,639 | * 4/1998 | Payne | 405/128 |

OTHER PUBLICATIONS

Virginia Department of Transportation, Road and Bridge Standards, vol. 1, 1996, detail 104.09.*

* cited by examiner

Primary Examiner—Carl D. Friedman
Assistant Examiner—Chi Nguyen
(74) Attorney, Agent, or Firm—David C. Jenkins; Eckert Seamans Cherin & Mellott, LLC

(57) ABSTRACT

A metal hazardous material storage facility where the floor is divided into an upper floor, having passages therethrough, and a lower floor, located below said upper floor and which has a sloped surface. A sensor, which is coupled to a leak detection system is located at the lowest point on the lower floor. Containers of hazardous material are stored on the upper floor. As such, regardless of where the container is stored in the facility, any fluid which leaks from a container will pass through the openings in the upper floor and flow down the sloped surface of the lower floor to the sensor.

39 Claims, 7 Drawing Sheets

HAZARDOUS MATERIAL STORAGE FACILITY WITH SLOPED FLOORS AND METHOD OF CONSTRUCTION

FIELD OF INVENTION

This invention relates to a metal hazardous material storage facility and, more specifically, to a storage facility having a sloped floor disposed below a container-supporting floor.

BACKGROUND OF THE INVENTION

Hazardous chemicals and waste are frequently placed in 55-gallon cylindrical barrels typically measuring about 22 to 23½ inches in diameter. The hazardous material can be stored in a liquid or solid form. Such drums can easily develop leaks over time. Periodic inspection can locate slow leaks, but catastrophic failure of a drum can occur and result in spillage of a large quantity of hazardous material. Accordingly, these barrels must be kept in a facility that has suitable safety features such as proper venting, fire and explosion protection, leakage protection with a sump built into the floor, and leakage detection.

Because it is preferable to maintain barrels containing hazardous materials upright, metal hazardous material storage facilities are presently constructed with floors that are generally horizontal or flat. This can be a disadvantage as liquid which leaks, either quickly or slowly, from a barrel tends to remain in the vicinity of the barrel. Therefore, to detect such a leak, a sensor must be located at each location where a barrel may be stored within the facility. Use of multiple sensors can be expensive, both to install and maintain.

Accordingly, there is a need for a metal hazardous material storage facility which can store multiple barrels of hazardous material and which allows a sensor to detect leaks from multiple barrels.

There is a further need for a method to easily construct a metal hazardous material storage facility which can store multiple barrels of hazardous material and which allows a sensor to detect leaks from multiple barrels.

SUMMARY OF THE INVENTION

These needs and others are satisfied by the present invention which provides a metal hazardous material storage facility having an upper floor and a lower floor. The upper floor, upon which the barrels of hazardous material rest, has a plurality of openings therethrough. The lower floor is sloped so that any liquid which spills from the barrels of hazardous material, regardless of their location within the facility, will collect in the lowest area of the lower floor. A sensor is placed at the lowest area of the lower floor so that any leak will be detected. The lower floor also provides a sump to store any hazardous material until it may be properly discarded.

The sloped floor of the present invention can be constructed using support members which are constructed of C-shaped beams having inverted L-shaped beams attached thereto. The L-shaped beams are attached at a descending angle along the upper portion of the C-shaped beams. The C-beams rest on the building foundation. At one end of the C-shaped beam, below the highest point on the lower floor, the L-shaped beam extends its maximum height above the C-beam. The L-shaped beam is angled toward the C-shaped beam so that, at the opposite end of the C-shaped beam, the L-shaped beam is substantially even with the top of the C-shaped beam. A planar floor member is placed on top of a plurality of support members thereby forming the sloped lower floor.

It is an object of this invention to provide a metal facility to store hazardous material having a leak detector capable of detecting a leak from multiple barrels stored within the facility.

It is a further object of this invention to provide a facility for storing hazardous material having a sloped sump floor.

It is a further object of this invention to provide a method of constructing a metal facility to store hazardous material having a leak detector capable of detecting a leak from multiple barrels stored within the facility.

A full understanding of the invention can be gained from the following description of the preferred embodiments when read in conjunction with the accompanying drawings.

BRIEF DESCRIPTION OF THE DRAWINGS

FIG. 3A shows a U-shaped channel and FIG. 3B shows a V-shaped channel.

FIG. 8A shows a view of the sloped floor without a channel, and FIG. 8B shows a cross sectional view of a facility having two storage portions without a channel.

FIG. 9A shows a perspective view of the support member. FIG. 9B shows a cross sectional view taken along line 9B—9B of FIG. 9A. FIG. 9C shows a cross sectional view taken along line 9C—9C of FIG. 9A. FIG. 9D shows a cross sectional view taken along line 9D—9D of FIG. 9A.

DESCRIPTION OF THE PREFERRED EMBODIMENT

Figure 1:
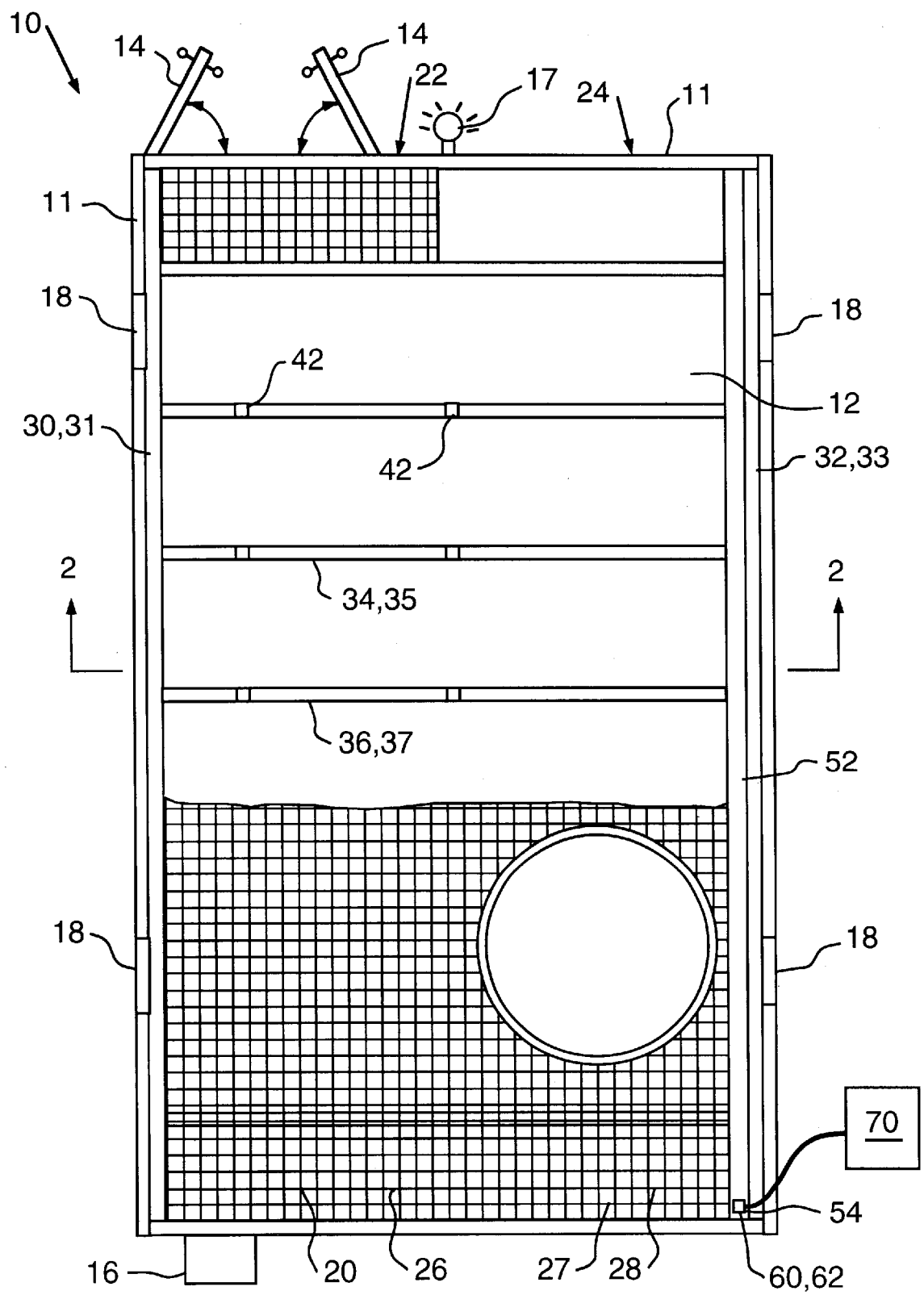
FIG. 1 is a partially cut-away top view of a hazardous material storage facility according to the present invention.
Figure 2:
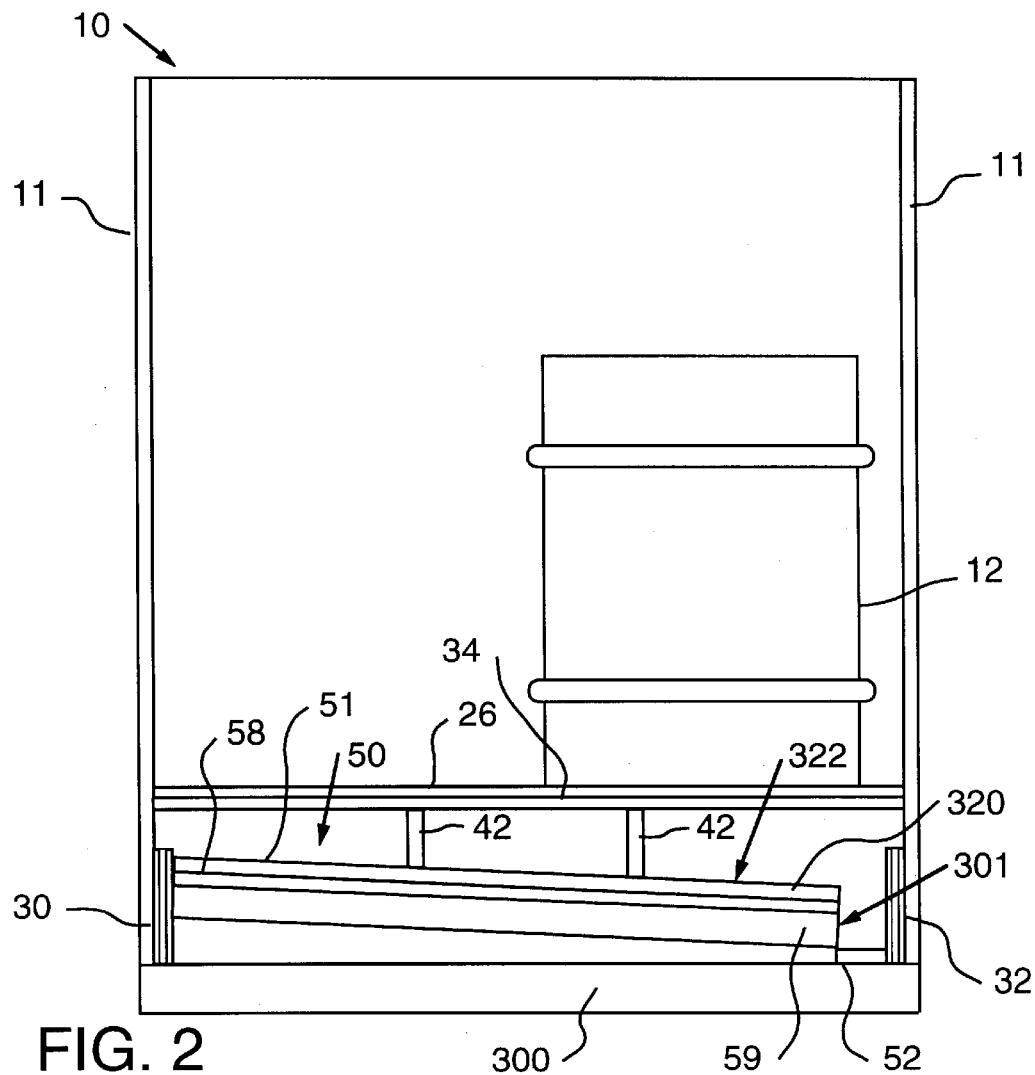
FIG. 2 is a side view of a hazardous material storage facility according to the present invention taken along line 2—2 of FIG. 1.

A metal hazardous material storage facility 10 according to the present invention is shown in FIGS. 1 and 2. Although a facility 10 of any shape may be used with this invention, in the preferred embodiment, the facility 10 has a rectangular floor plan having a length and a width. The facility 10 incorporates a dual floor structure which includes an upper floor 20 and a lower floor 50 which are both disposed above a foundation 300. The upper floor 20 is divided into an aisle portion 22 and a storage portion 24. Both the aisle portion 22 and the storage portion 24 have upper floor surfaces 26, 27 with openings 28 therethrough. In the preferred embodiment, the upper floor surfaces 26, 27 are either steel grating or diamond plate. In the preferred embodiment, the aisle portion 22 extends the length of facility 10 with a storage portion 24 on at least one side of the aisle portion 22. Upper floor 20 supports a container 12 of hazardous material. Container 12 is typically in the form of a steel cylindrical barrel having a diameter of about twenty inches to twenty-three and one-half inches and a height of about two to four feet. Container 12 typically holds fifty-five gallons of hazardous material. Hazardous material can include solid and liquid hazardous chemicals or waste.

The upper floor 20 is disposed above the lower floor 50 and supported by members 30, 32, 34, and 36 which extend about the perimeter of facility 10 and define the outer boundary of the storage portion 24 and aisle portion 22 of the facility 10. Upper floor support members 30, 32 extend the length foundation 300. Upper floor support members 34, 36 extend the width of foundation 300 and are generally perpendicular to upper floor support members 30, 32. Upper floor support members 30, 32, 34, and 36 each have an upper surface 31, 33, 35, and 37. Upper floor support members 30, 32, 34, 36 are disposed on top of foundation 300. Upper floor support cross beams 38, 40, extending parallel to members 34, 36, may also be included. As shown on FIG. 2, upper floor support cross beams 38, 40 are disposed above lower floor 50 and may be supported by intermittent supports 42, 43. Supports 42, 43, which rest on sloped floor 50 (described below) may be of different heights as required to ensure upper floor 20 is generally horizontal. In the preferred embodiment, upper floor support members 30, 32, 34, and 36 are hollow, rectangular tubular members, and upper floor support cross beams 38, 40 are inverted L-shaped beams.

Figure 3A:
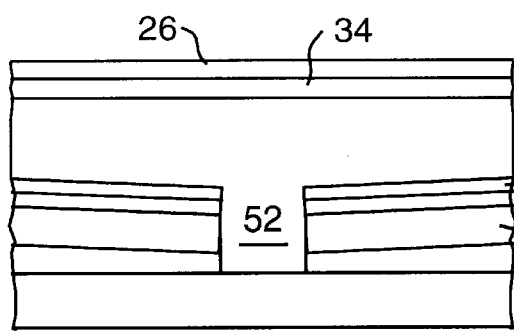
FIGS. 3A and 3B show alternate configurations of the channel. Specifically.
Figure 3B:
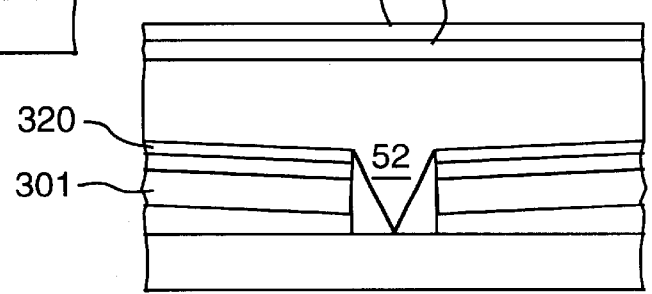

Lower floor 50 has a surface 51 sloped in at least one direction having an upper end 58 and a lower end 59. In the preferred embodiment, lower floor 50 is sloped in a direction generally parallel to members 38, 40. Additionally, lower floor 50 includes a channel 52, which is sloped in a direction generally perpendicular to the slope of the lower floor 50. That is, channel 52 is sloped in a direction parallel to members 30, 32. The channel is preferably U-shaped, as shown in FIG. 3A. However, as shown in FIG. 3B, any shape channel, e.g. a V-shaped channel, is acceptable. As shown in FIG. 1, the lower end of channel 52 is the lowest point 54 of the lower floor 50. The upper end 58 is at least one inch higher than lower end 59. In the rectangular facility 10 of the preferred embodiment, the length of the storage portion 24 and aisle portion 22 is about seventy-two feet and the sloped floor 50 has a width of about fifteen feet. With these limitations, at least one gallon of liquid hazardous material spilled anywhere in the aisle portion 22 or the storage portion 24 will result in a detectable amount of liquid gathering at the lowest point 54 of channel 52.

Figure 4:
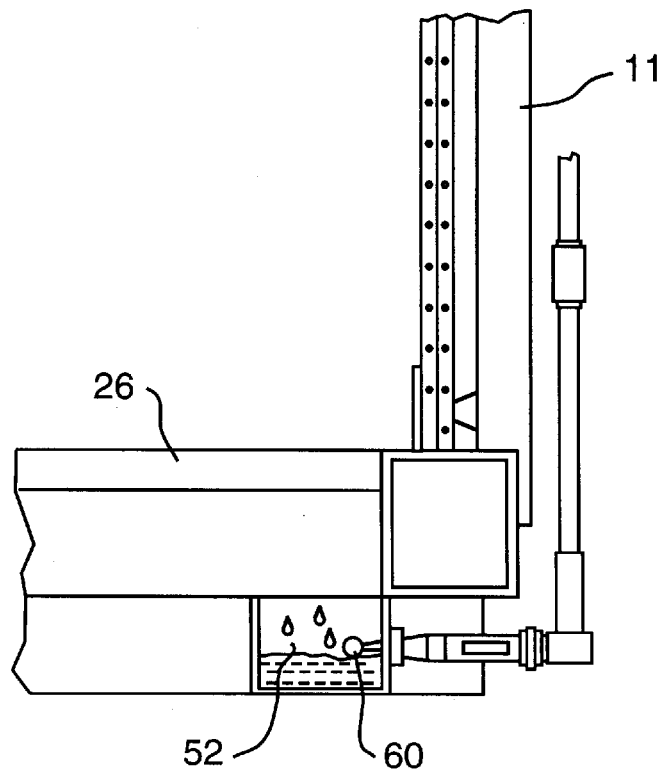
FIG. 4 shows a detail of the float sensor.
Figure 5:
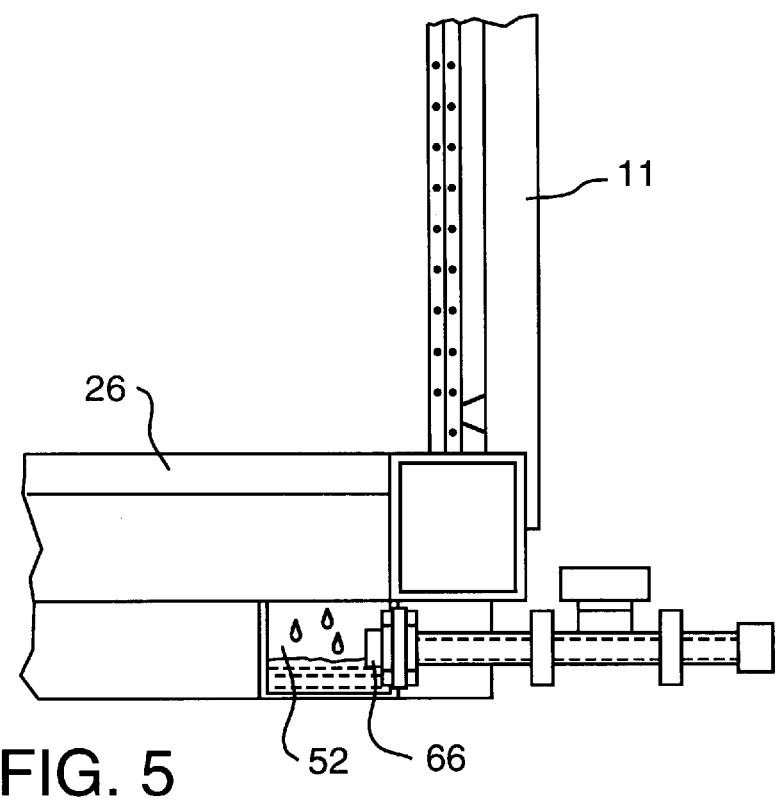
FIG. 5 shows a detail of the sump drain.

As shown in FIG. 4 sensor 60 is disposed at the lowest point 54 of channel 52. The sensor 60 generates an output signal when exposed to a liquid. The sensor is, preferably, a float sensor. However, any type of sensor, such as an infrared sensor can be used. To accommodate the float sensor 60, the lowest point 54 may include a sensor pit 62 (shown in FIG. 1) extending below channel 52. The output signal from the sensor 60 cooperates with a spill detection system 70 which controls other safety devices such as vents 18 and warning lights 17. When the spill detection system 70 receives an output signal from sensor 60, vents 18 and warning lights 17 are activated according to a predetermined protocol. As shown in FIG. 5, a drain 66 may be located adjacent to the sensor 60. The drain 66 communicates with a storage tank (not shown) located outside of the facility 10.

Figure 6:
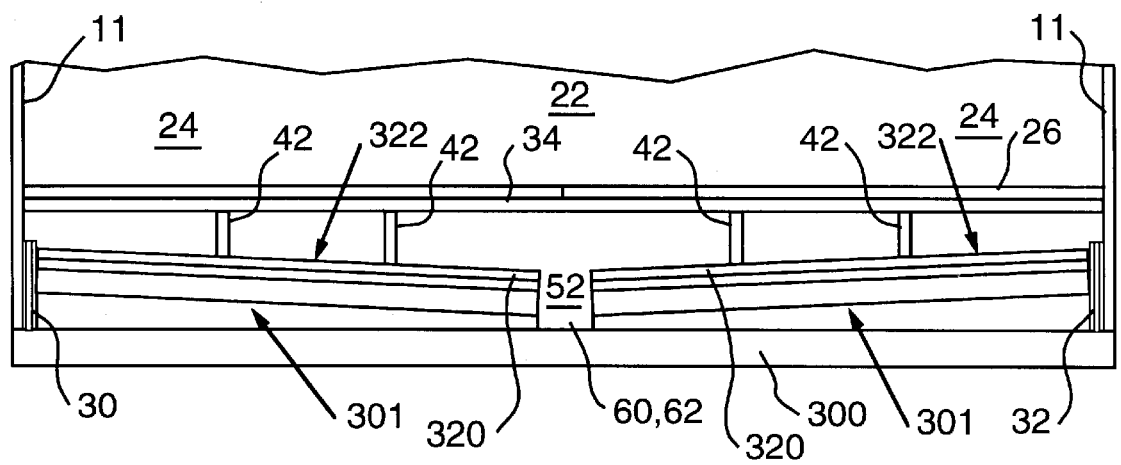
FIG. 6 is a cross sectional view of an alternate embodiment having two storage portions.

The invention may be practiced with a facility 10 having an alternative floor plan. In the most preferred embodiment, shown in FIG. 6, facility 10 includes two storage portions 24 on the upper floor 20 located on either side of aisle portion 22. Below each storage portion is a sloped lower floor 50. Each sloped lower floor 50 is sloped down to a central channel 52 located generally below the center of aisle portion 22. As before, channel 52 is sloped in a direction perpendicular to sloped floors 50. In this configuration, channel 52 is located below aisle 22. Aisle 22 is visible through grating floor 26. Thus, any hazardous material collected in channel 52 is visible. Additionally, should the hazardous material be ignited, the resulting flames would be concentrated under aisle 22 and not storage portions 24. A fire located in the channel 52 is more likely to be extinguished quickly as the burning material will be exposed to an overhead fire suppression system and water from such a fire suppression system will gather in channel 52.

Figure 7:
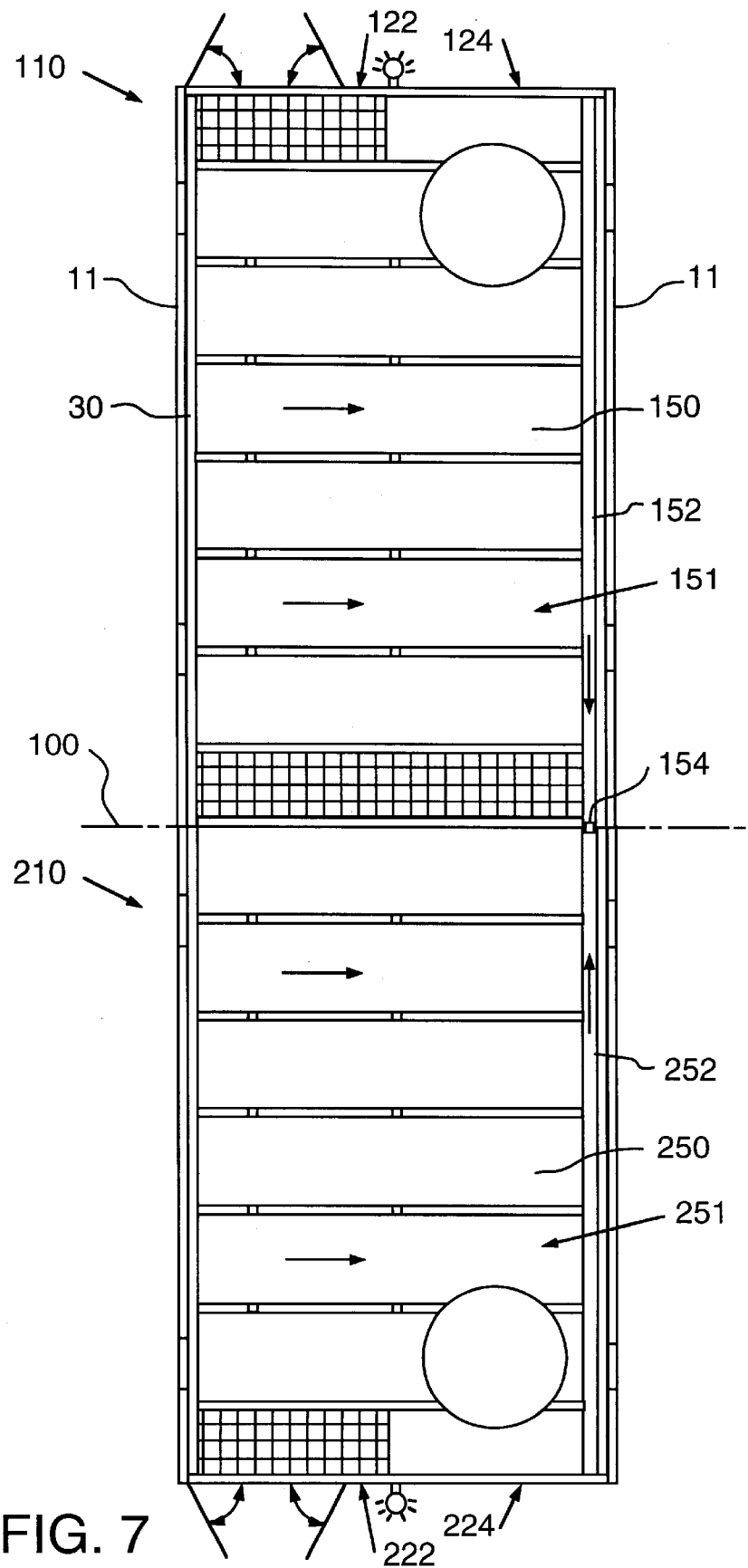
FIG. 7 is a top view of an alternate embodiment having multiple sections.

Additionally, the floor plan described above may be mirrored, or duplicated, within one facility 10. An example of a facility 10 having mirrored storage areas is shown in FIG. 7. The facility 10 may have two legs, 110, 210 each with an aisle portion 122, 222, and each with storage portions 124, 224 located on one side of aisle portions 122, 222. The legs 110, 210 are joined at a central line 100. The lower floors 150, 250 below each aisle portion 122, 222 and storage portion 124, 224 have a contiguous sloped surface 151, 251. Channels 152, 252 are sloped toward central line 100, with the lowest point 154 located along central line 100. As detailed above, a sensor 160 is located at the lowest point 154 in channels 150, 250. The length of storage portions 124, 224 and aisle portions 122, 222 is about seventy-two feet each. As before, the upper end of sloped surfaces 151, 251 are at least one inch higher than the lower end. The sloped floors 150, 250 are about fifteen feet wide. With these limitations, at least one gallon of liquid hazardous material spilled anywhere in either aisle portion 122, 222 or either storage portions 124, 224 will result in a detectable amount of liquid gathering of the lowest point 154 of channels 152, 252. A facility 10 according to this invention with more than two legs can be constructed.

Figure 8A:
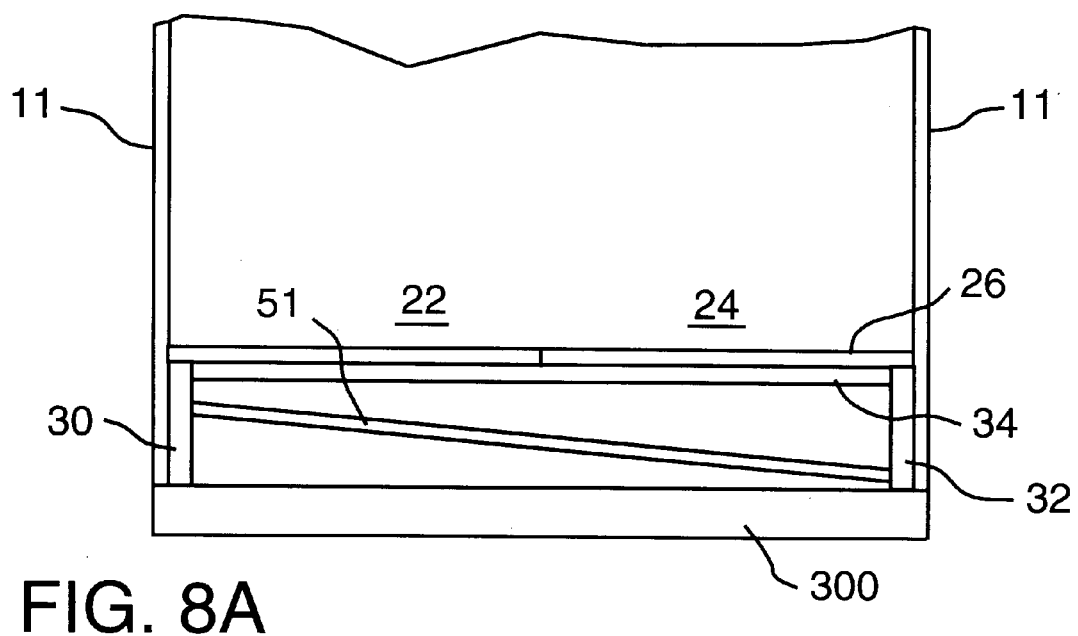
FIGS. 8A and 8B are a cross sectional view of alternate embodiments. Specifically.
Figure 8B:
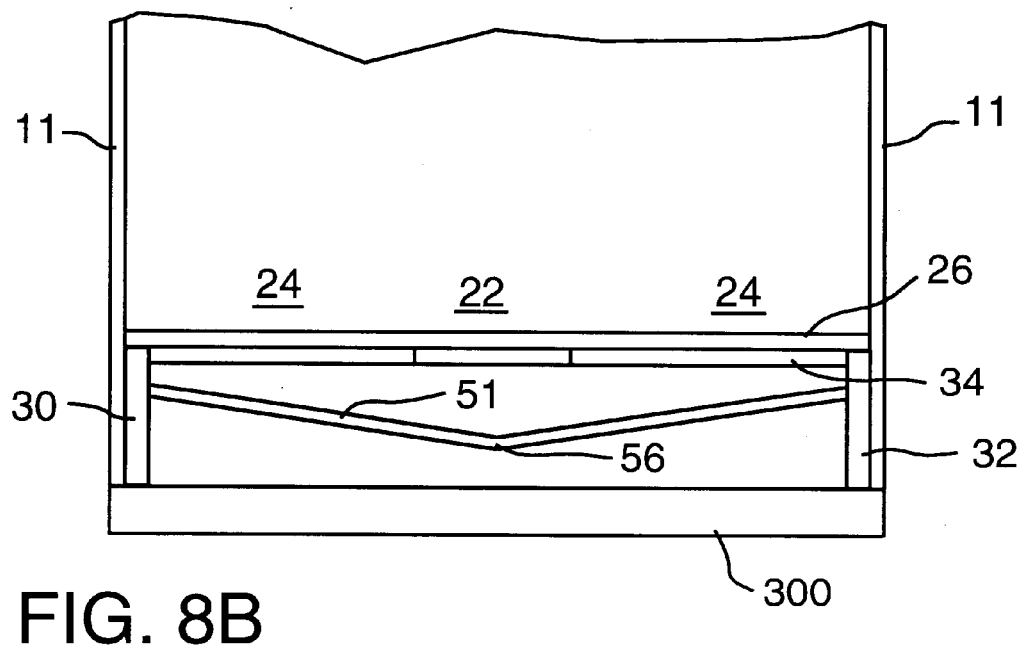
Figure 9A:
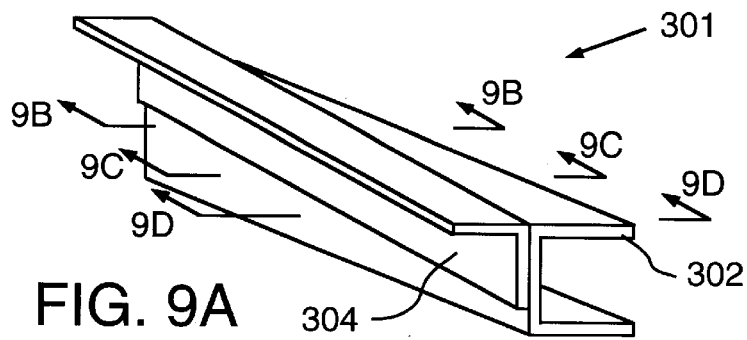
FIGS. 9A, 9B, 9C and 9D are a view of the support member. Specifically.
Figure 9B:
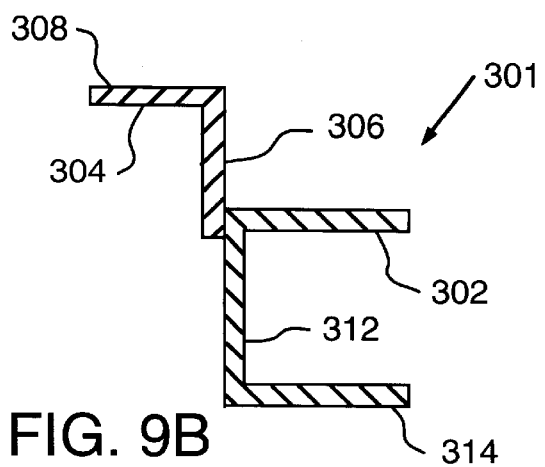
Figure 9C:
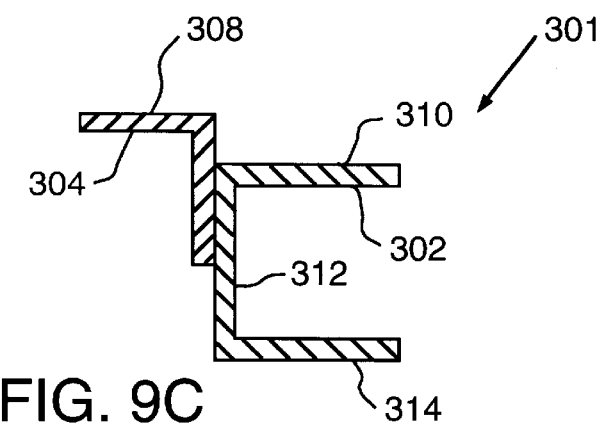
Figure 9D:
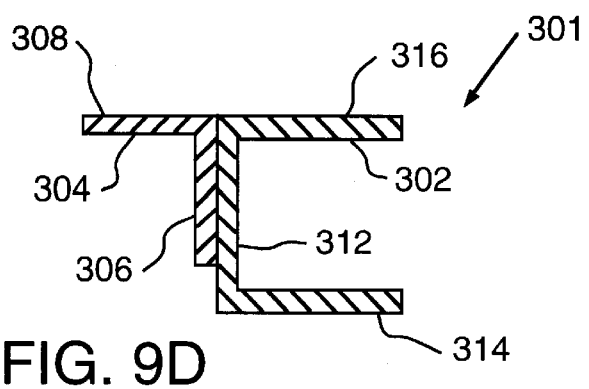

An alternative embodiment of this invention can be constructed wherein the lower floor 50 does not include a channel 52. As shown in FIGS. 8A, in an embodiment having a single storage area 24 disposed adjacent to an aisle 22. Thus, the lowest point 54 (not shown) will be located at one end of facility 10 adjacent to member 32. Alternatively, in an embodiment having two storage portions 24 located on either side of aisle 22, as shown in FIG. 8B, but without a channel 52, the lower floors 50 meet at a vertex 56 generally below aisle 22. Thus, the lowest point 54 (not shown) will be located at one end of facility 10 at vertex 56. In either of these embodiments, sensor 60 (not shown) is disposed at the lowest point 54.

As shown on FIGS. 9A, 9B, 9C and 9D, the sloped surface 51 of lower floor 50 may be constructed using a support members 301 having a variable height that are disposed on a flat foundation 300. The support members 301 include C-beams 302 with attached inverted L-shaped members 304. The inverted L-shaped member 304 includes a long member 306 and a short member 308 attached at a vertex and disposed generally at a right angle. C-beams 302 include a generally horizontal top and bottom members 310, 314, connected to each other by a generally vertical member 312. L-shaped members 304 are inverted and attached at a descending angle to C-beams 302 by long member 306. At a first end 320 of C-shaped beam 302, L-shaped member 304 extends a maximum height above top member 310. At a second end 322 of C shaped beam 302 short member 308 of L-shaped member 304 is substantially even with top member 310. L-shaped members 304 may be attached to C-beams 302 by any method such as fasteners or welding.

As shown in FIG. 2, to create sloped surface 21, the support members 301 are disposed on a foundation 300. A planar member 320 is placed across support members 301 resting on short member 308. Planar member 320 is preferably made of steel plate. Planar member 320 can be welded to upper floor support members 30, 32, 34, and 36 and to channel 52 thereby creating a seal between the planar member 320 and the support members 30, 32, 34, and 36. Optionally, a polypropylene top surface 322 may be installed over planar member 320.

As shown on FIG. 1, facility 10 further includes lateral walls 11 extending generally vertically from foundation 300, doors 14 in walls 11, as well as safety features such as a ventilator fan 16, warning lights 17 and explosion vents 18. These elements are well known in the prior art. As noted above, the safety features may be controlled by the spill detection system 70 according to a predetermined protocol.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A metal hazardous material storage facility for storing containers having hazardous material therein, said facility comprising a metal upper floor having passages therethrough and a lower floor disposed below said upper floor having a sloped surface, said lower floor is supported by a plurality of support members which includes C-shaped beams each having at least one inverted L-shaped beam attached thereto.

2. The metal hazardous material storage facility of claim 1, including a spill detection system in said facility for sensing when said hazardous material has escaped from said containers.

3. The metal hazardous material storage facility of claim 2, wherein said spill detection system includes a sensor disposed at a lower end of said lower floor wherein any said hazardous material that escapes from said containers runs down said sloped surface and can be detected by said sensor.

4. The metal hazardous material storage facility of claim 3, wherein said sensor is a float sensor.

5. The metal hazardous material storage facility of claim 1, wherein said lower floor includes at least one channel disposed at a lower end of said sloped surface.

6. The metal hazardous material storage facility of claim 5, wherein said channel includes a sloped bottom surface.

7. The metal hazardous material storage facility of claim 6, wherein said channel bottom surface slope is generally perpendicular to said lower floor sloped surface.

8. The metal hazardous material storage facility of claim 7, wherein said float sensor is disposed in said channel.

9. The metal hazardous material storage facility of claim 8, including a drain adjacent to said sensor, said drain coupled to a storage tank.

10. The metal hazardous material storage facility of claim 5, wherein said facility is approximately seventy-two feet long.

11. The metal hazardous material storage facility of claim 10, wherein said channel is a U-shaped channel.

12. A metal hazardous material storage facility for storing containers having hazardous material therein, said facility comprising
    an upper floor having passages therethrough and a lower floor disposed below said upper floor having a sloped surface;
    wherein said lower floor includes at least one channel disposed at a lower end of said sloped surface;
    wherein a sensor is disposed in said channel;
    wherein said facility is about seventy-two feet long;
    a drain adjacent to said sensor, said drain coupled to a storage tank; and
    wherein said channel is a V-shaped channel.

13. The metal hazardous material storage facility of claim 10, wherein said lower floor is approximately fifteen feet wide.

14. A metal hazardous material storage facility for storing containers having hazardous material therein, said facility comprising
    an upper floor having passages therethrough and a lower floor disposed below said upper floor having a sloped surface;
    wherein said lower floor includes at least one channel disposed at a lower end of said sloped surface;
    wherein said lower floor includes at least one channel disposed at a lower end of said sloped surface;
    wherein a sensor is disposed in said channel;
    a drain adjacent to said sensor, said drain coupled to a storage tank;
    wherein said facility is about seventy-two feet long; and
    wherein said sloped floor has an upper end and a lower end, said upper end being at least one inch higher than said lower end.

15. The metal hazardous material storage facility of claim 1, wherein said upper floor is a grating.

16. The metal hazardous material storage facility of claim 1, wherein said lower floor has at least two sloped portions.

17. The metal hazardous material storage facility of claim 16, wherein said lower floor includes at least one channel disposed at said lower end of each said sloped surface.

18. The metal hazardous material storage facility of claim 17, wherein said channel includes a sloped bottom surface.

19. The metal hazardous material storage facility of claim 18, wherein said channel bottom surface slope is generally perpendicular to each said lower floor sloped surface.

20. The metal hazardous material storage facility of claim 19, wherein said sensor is disposed within said channel.

21. The metal hazardous material storage facility of claim 20, wherein said at least one channel is disposed between said sloped floor portions at the lower end of each sloped floor portion.

22. The metal hazardous material storage facility of claim 21, wherein said sensor is a float sensor.

23. The metal hazardous material storage facility of claim 22, wherein said lower floor is approximately fifteen feet wide.

24. The metal hazardous material storage facility of claim 22, wherein said facility is approximately seventy-two feet long.

25. The metal hazardous material storage facility of claim 22, wherein said sloped floor has an upper end and a lower end, said upper end being at least one inch higher than said lower end.

26. The metal hazardous material storage facility of claim 22, wherein said channel is a U-shaped channel.

27. A metal hazardous material storage facility for storing containers having hazardous material therein, said facility comprising:
    an upper floor having passages therethrough and a lower floor disposed upper floor having a sloped surface;
    wherein said lower floor has at least two sloped portions;

wherein said lower floor includes at least one channel disposed at said lower end of each said sloped surface;

wherein said channel includes a sloped bottom surface;

wherein said channel bottom surface slope is generally perpendicular to each said lower floor sloped surface;

wherein a sensor is disposed within said channel;

wherein said at least one channel is disposed between said sloped floor portions at the lower end of each sloped floor portion;

wherein said sensor is a float sensor; and wherein said channel is a V-shaped channel.

28. The metal hazardous material storage facility of claim 16, wherein said upper floor is a grating.

29. The metal hazardous material storage facility of claim 1, wherein said inverted L-shaped beams are attached to said C-shaped beams at a descending angle.

30. The metal hazardous material storage facility of claim 29, wherein said C-shaped beams include a top member and said L-shaped beams include a long member, said long member having a tip and a medial portion, and a short member coupled to said long member generally perpendicularly;

said support members having said L-shaped members attached at one end of said C-beams at said tip so that said L-shaped beam extends above said C-shaped beam and having said L-shaped members attached at another end of said C-beams adjacent to said short member so that said short member generally aligned with said top member.

31. The metal hazardous material storage facility of claim 30, wherein said facility includes a foundation; and said support members are disposed on said foundation.

32. The metal hazardous material storage facility of claim 31, wherein said lower floor includes a planar member disposed on top of said support members.

33. The metal hazardous material storage facility of claim 30, wherein said lower floor includes a layer of polypropylene on top of said planar member.

34. A method of constructing a metal hazardous material storage facility for storing containers containing hazardous material comprising:

providing support members having an angled upper surface;

mounting a lower floor on said support members so that said lower floor has a sloped surface; and providing an upper floor having passages above said lower floor.

35. A method of constructing a sloped floor for a hazardous material storage facility comprising the steps:

providing a foundation;

providing support members having an inverted L-shaped beam attached to a C-shaped beam, said L-shaped beam having a long member with a tip, and a short member joined generally perpendicularly, and said C-beam having a top member, said L-shaped beam attached by said tip to one end of said C-shaped beam and attached adjacent to said short member to a second end of said C-shaped beam;

placing a plurality of said support members on said foundation;

providing a planar member disposed on said support members creating a sloped floor.

36. The method of claim 35, comprising the further steps of:

providing a plurality of upper floor support members which rest on said foundation and which are disposed around said support members.

37. The method of claim 36, comprising the further step of:

providing an upper floor surface, having openings therethrough, disposed on said upper floor support members.

38. The method of claim 37, comprising the further step of:

providing a leak sensor located at the lowest point on said sloped floor.

39. The method of claim 38, comprising the further step of:

providing a channel extending along the lower end of said sloped floor.

* * * * *

UNITED STATES PATENT AND TRADEMARK OFFICE
CERTIFICATE OF CORRECTION

PATENT NO.    : 6,305,131 B1
DATED         : October 23, 2001
INVENTOR(S)   : Frederick W. Romig It is certified that error appears in the above-identified patent and that said Letters Patent is hereby corrected as shown below:

<u>Column 6,</u>
Line 66, after "disposed" add -- below said --.

Signed and Sealed this

Tenth Day of September, 2002

Attest:

Attesting Officer

JAMES E. ROGAN
*Director of the United States Patent and Trademark Office*